US012669398B1

(12) United States Patent
Chaudhuri et al.

(10) Patent No.: US 12,669,398 B1
(45) Date of Patent: Jun. 30, 2026

(54) FILTER LEAK DETECTION APPARATUS

(71) Applicants: Sid Chaudhuri, East Brunswick, NJ (US); Pollux Technologies LLC, East Brunswick, NJ (US)

(72) Inventors: Sid Chaudhuri, East Brunswick, NJ (US); Gavin E Trutzenbach, Cream Ridge, NJ (US)

(73) Assignee: POLLUX TECHNOLOGIES LLC, East Brunswick, NJ (US)

( * ) Notice: Subject to any disclaimer, the term of this patent is extended or adjusted under 35 U.S.C. 154(b) by 0 days.

(21) Appl. No.: 19/288,547

(22) Filed: Aug. 1, 2025

(51) Int. Cl.
*G01M 3/26* (2006.01)
*F24F 11/39* (2018.01)
*F24F 11/52* (2018.01)

(52) U.S. Cl.
CPC ............... *G01M 3/26* (2013.01); *F24F 11/39* (2018.01); *F24F 11/52* (2018.01)

(58) Field of Classification Search
None
See application file for complete search history.

(56) References Cited

U.S. PATENT DOCUMENTS 9,593,678 B2 * 3/2017 Gray ....................... F04B 45/00
11,071,935 B2 * 7/2021 Quanci .................. G08B 21/12

* cited by examiner

*Primary Examiner* — Eric S. McCall
*Assistant Examiner* — Nigel H Plumb

(57) ABSTRACT

The present invention relates to an air filter leak detection system for use in air circulation systems. The system comprises a control device, an actuator, and at least one sensor capable of measuring airflow velocity or air pressure. The control device periodically executes a computer program stored in its memory to activate the actuator to sequentially position the sensor at multiple locations across the filter surface to ensure full coverage. At each location, the sensor measures a leak detection parameter, which is compared by the control device against a threshold value which may be determined as an average of previously measured values. When a leak is identified based on the comparison, the system generates and transmits an alert to a user device, including the precise location of the leak. This system enables continuous, in-situ monitoring of filters, detecting both the occurrence and position of leaks without interrupting system operation.

21 Claims, 6 Drawing Sheets

Filter Regen App

☐ ☐ ☐

Regenerate filter

FILTER LEAK DETECTION APPARATUS

FIELD OF THE INVENTION

This invention generally relates to air filters capturing airborne particulates in air handling systems such as HVAC (Heating, Ventilation and Airconditioning) systems and specifically, to detect a leak in a filter while in operation based on air flow measurements.

BACKGROUND OF THE INVENTION

This invention relates to an air filter system that detects if there is a leak in an air filter in situ triggered by a predetermined threshold of an air flow parameter.

Air filters are used in a variety of systems to trap and remove undesirable particulates from an air stream in an air circulation system. Air filters are typically installed in the path of the air stream contained in an enclosure, conduit or duct in the air circulation system to capture dust and other undesirable particulates and to allow clean air to flow into the system. Examples of such applications include HVAC systems at residential and commercial buildings.

A filter structure includes a frame in which a semipermeable membrane is attached. The structure of the frame can be a simple frame like a picture frame. Some filters may have more elaborate shapes. The filter membrane is made from a variety of materials including paper, cloth, plastic fibers, and other synthetic fibers. Examples of membrane types include polytetrafluoroethylene (PTFE), polyvinylidene difluoride (PVDF), nylon, cellulose acetate, polypropylene, polyethersulfone (PES), track etched polycarbonate, and mixed cellulose ester (MCE).

As more air passes through a filter more debris accumulates over time in the filter resulting in significant blockage of the airflow through the filter. Henceforth the amount of dust or debris in weight accumulated per unit area on a filter will be called the filter load, dust load or simply load. The blockage of the filter causes air flow to diminish and to reduce the effectiveness of the air circulation system. Additionally, air pressure difference between the two sides of filter increases as the filter load increases. High differential pressure can cause a filter to break and air to leak from a weak spot on the filter.

In buildings such as chip manufacturing clean rooms, operation theaters in hospitals, it is critically important to detect a leak immediately when it appears in a filter. Currently, these expensive filters are tested periodically to detect leaks. One such methos is to inject polyalphaolefin (PAO), a type of synthetic hydrocarbon used as a base oil in lubricants, onto the filter at high speeds and measuring the PAO density passing through the filter. This method of detection is inadequate for two reasons. First, the test itself stresses a filter to the extent that a leak could appear due to the high impact testing methods. Second, it does not detect leaks in real time. A leak may appear right after a successful test where no leak was detected. And the air will be contaminated until the next test is conducted.

CN109489915B invention disclosed a gas sealing performance detection device, comprising a main cabin for placing a gas sealing element to be detected, pressure sensors, leak detection sensors, a sliding guide rail connected with an infrared thermal imager, and an analysis display screen is installed in the thermal cabin. In this invention the cabin or a gas sealing element is filled with a filling gas and a tracer gas at high pressure. Sliding guide rails are arranged on the inner wall of the main cabin body at different heights, and infrared thermal imagers are connected to the sliding guide rails in a sliding mode and used for shooting from various angles to obtain infrared image. Optionally, pressure sensors are placed at different positions of the upper, middle and lower parts of the main cabin body inner wall. From the images taken from different angles by the images on the sliding rails, and the pressure and leak detection data for the tracer gas and the filling gas taken by the sensors placed at fixed locations at different heights any presence of leaks are detected.

The invention of CN109489915B requires a filter to be placed in the leak detection device. Consequently, it is not suitable for detecting leaks in a filter in situ. For in situ leak detection, airflow cannot be blocked by the detection device and placing tracer gas and filling gas for leak detection is infeasible.

U.S. Pat. No. 11,071,935 provides a particulate detection system for industrial facilities. This system uses a set of particulate detectors, one detector corresponding to each of the filters in the system. Each detector is fixed in a specific location, and it detects particulates leaked from anywhere from the filter to which it is dedicated to. A pusher charger machine (PCM) is typically used in coke ovens for coke manufacturing. In one embodiment of this invention, a particulate detector is mounted on the PCM because "This present invention overcomes this deficiency of conventional technologies in part because the detection device includes a probe and does not include wires." In this invention, the detector is not purposefully moved from one location to another location in a controlled and determined manner to measure differential pressure at a plurality locations and to detect the presence of any leakage from the differential pressure data at the plurality of locations.

Thus, there is a critical need for a solution to test air filters for leakage in situ and without hindering the operation of the air filtration system, particularly where expensive air filters are used such as in clean rooms and hospitals, in real time when the leak first appears and without damaging the filter.

SUMMARY OF THE INVENTION

The present invention provides systems and methods to detect in situ a filter leak promptly when it appears using pressure sensors or anemometers for detecting a leak, smart algorithms to pinpoint the location of the leak, and Internet of Things (IoT) for control and communication.

In accordance with the present invention, a filter leak detection apparatus comprises a housing, one or more filter leak detection sensors, a control unit, an arm to hold the sensors, and an actuator to move the arm and consequently to place the leak detection sensors to different locations in proximity to the downstream surface of the filter. The housing incorporates the control electronics for the actuator and the sensors. The control unit comprises a logic circuit, a central processing unit (CPU) or a microcontroller unit (MCU) and a memory. The control unit activates the actuator to move the arm on an external command or on the execution of a program logic stored in the memory. The control unit activates the sensors to take measurements of leak detection signals.

The leak detection apparatus is mounted on a frame of the filter or on a part of the air handling system where the filter is installed.

Examples of a leak detection sensor include but not limited to an anemometer to measure air flow velocity or a pressure sensor measuring air pressure or differential air pressure between upstream and downstream air flows, a capacitor sensor sensing increase of capacitance caused by higher air pressure in front of a leak, a resistor sensor measuring resistance change of a resistor by increased air pressure, a particle detector measuring particulate density, and a piezoelectric device measuring electric current or voltage caused by air pressure.

In one aspect of the invention, a plurality of leak detection sensors is evenly spaced on the movable arm. The arm is coupled with the actuator. The actuator is capable of moving the arm across a filter.

In another aspect of the invention, a single leak detection sensor is used. The sensor is attached to an actuator arm or a combination of two or more actuator arms. The actuator can place the single sensor at locations covering the entire surface of the filter for leak detection. For example, the actuator can move the actuator arm to place the sensor at different locations separated horizontally as well as at locations separated vertically so that the single sensor can be placed at locations covering the entire filter to detect a leak anywhere on the filter.

In another aspect of the invention, the control unit activates the actuator to move the arm in order to place the sensor array at a particular location in front of the filter based on an external command or the execution of a program logic stored in the memory to measure the filter load. When the sensor array is placed by the arm at a desired location, the control unit sends a sensor activation signal to each of the sensors. Each of the sensors has a unique identification (ID). The control unit uses the ID address to send the sensor activation signal to a specific sensor. Each of the sensors upon receiving the sensor activation signal from the control unit is activated to measure leak detection parameter values.

In another aspect of the invention, the leak detection parameter is one of capacitance, resistance, pressure, and temperature among others.

In another aspect of the invention, the leak detection parameter is the velocity of air flowing through the orifice of the filter leak. The velocity of air flow can be measured by a variety of types of devices including an anemometer measuring velocity using rotating vanes, a pitot tube which calculates air flow velocity from the difference of total pressure measured at a point directly facing the flow and static pressure measured at a point without air flow, and airflow resistance measurement devices. The theoretical value of the velocity can be calculated from the pressure data using Bernoulli's equation which is applicable for typical differential pressure exerted on an air filter. If $P_2$ and $P_1$, are the values of air pressure at the upstream and the downstream side of the filter, respectively, and $\rho$ is the density of air then the Bernoulli's equation yields the velocity of air flowing through the leak, $v=2 \cdot \Delta P/\rho$, where $\Delta P=P_2-P_1$ is the differential pressure. Using a value of 140 Pa for $\Delta P$ which is typical for a highly loaded HVAC filter and the temperature value of 30° C., we obtain $v=15.5$ m/s. Typical velocity of air on the upstream and the downstream side of an HVAC filter is 1-3 m/s and 3-5 m/s, respectively. Thus, the velocity measured in front of a leak would be significantly higher than at other locations and the higher velocity compared to the expected theoretical velocity. Thus, the presence of a leak can be determined by comparing the measured air velocity with the calculated value of the air velocity using Bernoulli's equation.

The sensor sends the leak detection parameter value including the sensor identification to the control unit. The control unit commands the sensor actuators to move the arm to a new location in front of the filter and commands the sensors to measure the leak detection parameter value at the new location.

In another aspect of the invention, the control unit is programmed to place the sensor arm at multiple evenly spaced locations in front of the filter to cover the entire surface area of the filter. For example, the control unit places the sensor arm and takes sensor data at 10 locations with a regular 2 cm spacing of the sensor arm of a 20 cm wide filter. Once the leak detection parameter value measurements from multiple locations for a data acquisition session are completed, the control unit commands the sensor actuator to retract the actuator arm into its original position so that the filter is no longer blocked by the arm and the leak detection sensors.

In another aspect of the invention, the control unit is programmed to periodically activate the actuator and to take the leak detection parameter value. The control unit can also activate the actuator and direct the leak detection sensors to measure the leak detection parameter values responsive to a signal received from another computer device.

Having been directed by the control unit, a leak detection sensor measures the leak detection parameter value multiple times at a specific location. The number of times the measurement is repeated is controlled by the control unit. The control unit receives the leak detection parameter values from the sensor and calculates an average value of the leak detection parameter. The control unit uses the average leak detection parameter value as the leak detection parameter value for that specific location.

In another aspect of the invention, the control unit compares the leak detection parameter value with a predetermined threshold leak detection parameter value. If the difference of the average leak detection parameter value of a sensor at a specific location with the predetermined leak detection parameter value is higher than a predetermined threshold leak detection parameter value, then the control unit determines that there is a leak in the neighborhood of the specific location.

In another aspect of the invention, when the control unit determines the presence of a leak, the control unit sends a positive leak detection signal including the location of the leak to an external device using an antenna of the apparatus. The location of the leak is determined by the known location of the sensor when it detected the leak. The location of the sensor is determined by the location of the actuator arm and the location of the specific sensor on the actuator detecting the leak on the actuator arm when multiple sensors are used. The location of the sensor is determined by the location of the actuator arm coordinates when a single sensor is used.

In another aspect of the invention, the predetermined threshold leak detection parameter value is calculated based on a running average of the leak detection parameter values measured by all sensors at all previous locations where no leak was detected. For example, the leak detection parameter value is calculated by multiplying the average leak detection parameter value by a factor greater than 1. The predetermined threshold leak detection parameter value is stored in the memory of the control unit.

In another aspect of the invention, the control device calculates the predetermined threshold leak detection parameter value from the standard deviation values of some or all the leak detection parameter values measured by the sensors at the previous locations where no leak was detected. For example, there is inevitably some fluctuation of leak detection parameter values such measured by the sensors at multiple locations. The control unit calculates a running standard deviation value from the leak detection parameter values. The control unit calculates the predetermined threshold leak detection parameter value as a multiple of the standard deviation value. For example, for a 90% confidence level of correct leak detection, the predetermined threshold leak detection parameter can be set as 1.65 times the standard deviation. In this case, the control unit compares the difference of the leak detection parameter value and the average leak detection parameter value with the predetermined threshold leak detection parameter value calculated by using the standard deviation.

In another aspect of the invention, the leak detection sensors are activated to make leak detection sensing measurements only when the air handling system is blowing air through the filter. In order to detect when air is blowing through the filter, an air flow detector is placed by an actuator on the upstream side of the air filter. The air flow detector can be an air velocity measurement device or a pressure sensor. The detection of air flow by pressure sensor is determined if there is a substantial differential pressure between the upstream and the downstream air pressures. Alternatively, the control device is linked wirelessly with the air handling system to receive a signal anytime the blower of the air handling system is on. The control unit uses this signal to ascertain that a leak detection sensor is activated while the air handling system or the blower is on.

In another aspect of the invention, the control unit is coupled with a server computer in a cloud system via a wireless network such as a 4G or a 5G cellular network with IoT capability or a WiFi network. The control unit sends measured sensor data received from the leak detection sensors along with their IDs to the server computer using the IoT network capability. The server computer processes the received sensor data to determine if there is a leak in the filter.

In another aspect of the invention, the filter leak detection apparatus stores in its memory or receives from an external server system a value of a threshold leak detection parameter in the filter. The threshold leak detection parameter value is a value corresponding to a sensor signal value that is significantly different from the value expected from locations where there is no leak. For example, if the sensor measures air pressure, the sensor signal is expected to be higher at a location where there is a leak. As a result, for pressure sensor-based leak detection apparatus, the threshold leak detection parameter value is set at a higher value than the average value for locations where there is no leak and preferably at a slightly lower value than would be expected at a location where there is a leak. The filter leak detection apparatus compares the current average sensor signal value with the threshold leak detection parameter value. If the current average sensor signal value is higher than the threshold leak detection parameter value, then it is determined that there is a leak in the filter in the neighborhood of that particular sensor location.

In another aspect of the invention, the control unit moves the sensor arm around the detected approximate leak location to multiple locations within the current grid of the arm's locations. Using the previous example, the control unit places the sensor arm at multiple locations with the backward and forward 2 cm grids at 8 locations. From the sensor data at these locations, the control unit determines the location with higher accuracy where the sensor data deviates most from the threshold leak detection parameter value.

In another embodiment of the invention, two pressure sensors and two actuator arms are used. The first pressure sensor is attached to the first actuator arm and the second pressure sensor is attached to the second actuator arm in a way that they can be placed at locations directly facing each other on the two sides of the filter. Directed by the control unit, the first actuator arm places the first pressure sensor at a first location in front of the filter. Being directed by the control unit, the first sensor measures the air pressure at the first location. The control unit then retracts the first actuator arm to the housing of the device. Directed by the control unit, the second actuator arm places the second pressure sensor at a second location. The second location is on the opposite side of the filter with respect to the first location and directly facing the first location. Being directed by the control unit, the second sensor measures the air pressure at the second location. The control unit then retracts the second actuator arm to the housing of the device. The control unit receives the values of the air pressure measured by the first and the second pressure sensors. The control unit calculates the differential pressure value measured by the first and the second pressure sensors. The control unit directs the pressure sensors to be located at multiple locations covering the entire surface of the filter and calculates the differential pressure values for each of the locations. The control unit determines the presence of a leak in the filter by comparing the differential pressure values of all the locations. If the differential pressure values are substantially the same for all locations, the control unit determines that either no leak is present or there is no airflow, i.e., the air blower is not running. If the differential pressure value is substantially zero for all locations, then the control unit determines that there is no airflow. If the differential pressure value is substantially the same for all locations and substantially non-zero, then the control unit determines that there is no leak. The ambiguity of no-leak versus no airflow can be eliminated by making sure that pressure sensors measure the pressure values when there is airflow. The control unit may receive a signal from the air handling system if the air blower is on. On the other hand, if the differential pressure value at a specific location is substantially different from the differential pressure value at other locations, the control unit determines there is a leak in the filter at a location in proximity to the specific location.

BRIEF DESCRIPTION OF THE DRAWINGS

FIG. 1 depicts a schematic diagram of the salient components of an air handling unit including an air filter.

FIG. 2 depicts a schematic diagram of a filter leak detection system in accordance with the current invention.

FIG. 5 depicts a schematic diagram of the salient components of a communication system of the filter leak detection system in accordance with the current invention.

FIG. 6 depicts a schematic diagram of a filter leak detection system in accordance with another embodiment of the current invention.

DETAILED DESCRIPTION

Figure 1:
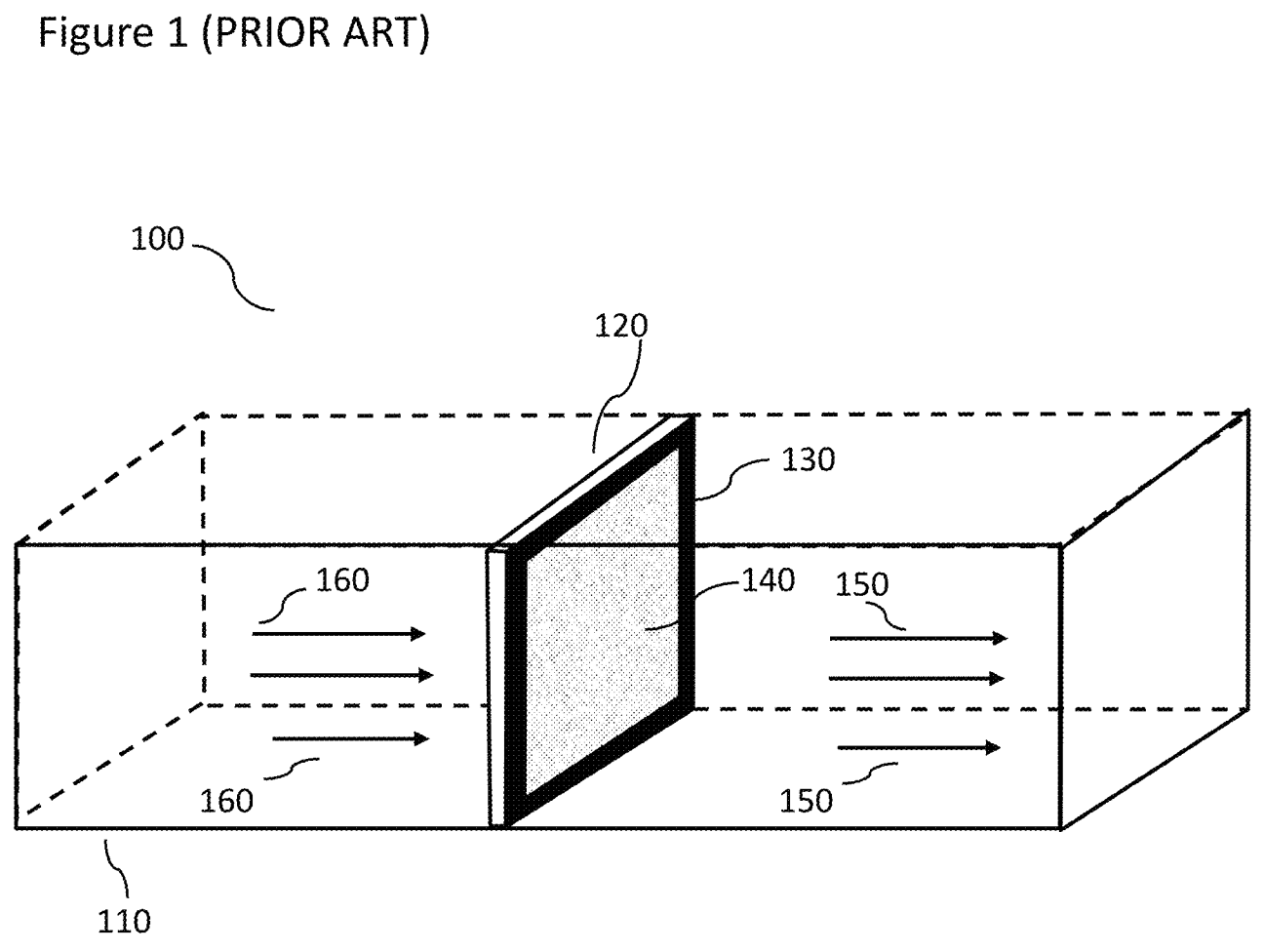
Figure 3:
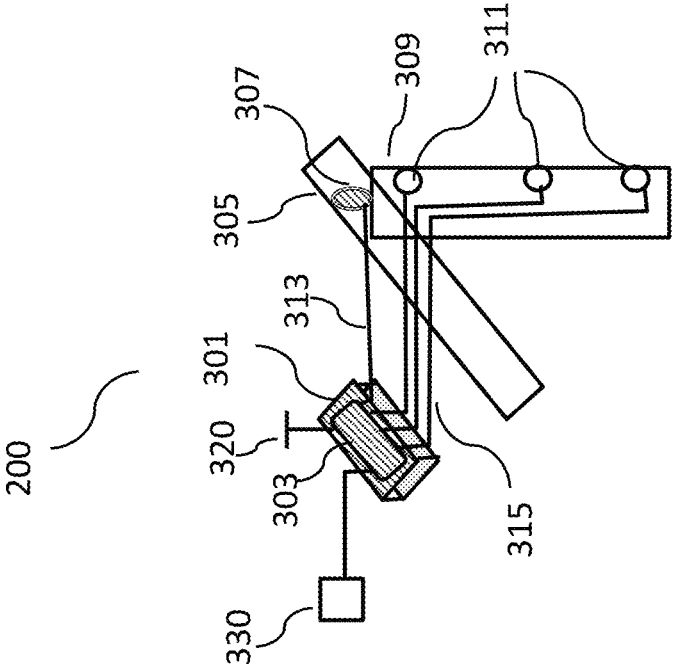
FIG. 3 depicts a schematic diagram of the salient components of a filter leak detection system of the current invention.

FIG. 1 depicts the salient components of an air handling unit 100. An air filter 120 is installed in air duct 110. Air filter 120 comprises a frame 130 to which a filter membrane 140 is attached. The filter membrane is a semi-permeable medium made from a variety of materials including paper, cotton fabric, and synthetic fiber. A motorized fan (not shown) causes outside air to flow as an incoming air stream 150 into duct 110. Air from incoming flow 150 passes through filter 120 and flows out as outgoing air stream 160. Dust and other particulates the incoming stream 150 are captured by air filter 120 and cleaner air goes out into outgoing stream 160. Over a period of time as more air passes through air filter 120 more particulates are deposited into air filter 120 and more the filter is blocked rendering the filter less effective.

Figure 2:
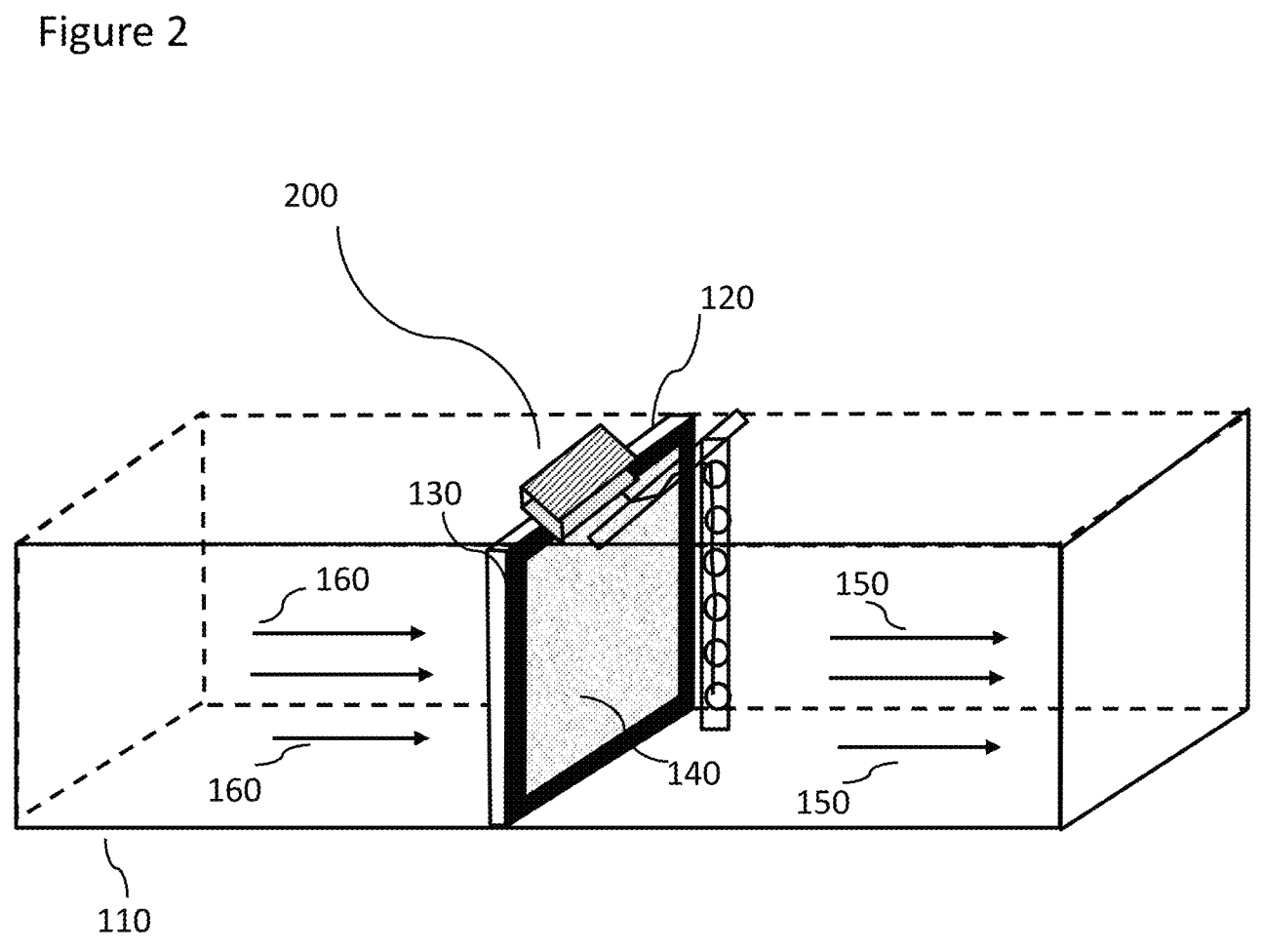

FIG. 2 depicts a schematic diagram of filter leak detection system 200 according to the current invention mounted on frame of duct 110 in proximity to filter 120.

FIG. 3 depicts a schematic diagram of the salient components of filter leak detection system 200 in accordance with a first embodiment of the current invention. Filter leak detection system 200 comprises a housing 301, a control unit 303, a guide rail 305, an actuator 307, a sensor arm 309, a set of leak detection sensors 311, a control and power link 313 to control and actuate actuator 307, a set of control, data and power links 315, antenna 320, and a power source 330.

Power source 330 is a battery or a connector to connect to an external power supply.

Control unit 303 is housed inside housing 301. Control unit 303 is coupled with actuator 307 via power and control link 313. Control unit 303 sends a control signal to actuator 307 via link 313. The control signal includes a signal specifying the location where arm 309 is to be moved. Upon receiving the control signal and using the power supplied via link 313, an actuator control unit (now shown) which is included in actuator 307 moves sensor arm 309 to the specified location. In an alternative embodiment, power to actuator 307 is supplied by an external power source, not by control unit 303 via link 313.

Actuator 307 may include a wheel or a roller that rolls along guide rail 305 when actuated. Alternatively, a linear actuator using a shaft and a gear can push and pull a rod which in turn is attached to arm 309. When the linear actuator rod is pushed or pulled, actuator arm 309 moves along guide rail 305.

Subsequent to placing sensor arm 309 to a desired location, control unit 303 sends a sensor activation signal via one of control links 315 to one of sensors 311 connected by the control link to activate the sensor. Having been activated, the sensor measures a leak detection parameter value and sends the measured leak detection parameter value along with its ID to control unit 303. Upon receiving the parameter value, control unit 303 sends a sensor activation signal via control links 315 to the remainder of sensors 311 one by one and receives leak detection signal data from each of sensors 311. In an alternative embodiment, a single control link coupling all the leak detection sensors is used. In this embodiment each sensor is addressed by control unit 303 using the identification (ID) of the sensors. The control signal activates only the sensor to which the activation signal is addressed.

Leak detection sensors 311 can be implemented by using a variety of sensing mechanisms. Examples of a leak detection sensor include but not limited to a pressure sensor measuring air pressure or differential air pressure between the downstream and upstream air flows, a capacitor sensor sensing increase of capacitance caused by higher air pressure in front of a leak, a resistor sensor measuring resistance change of a resistor caused by increased air pressure, a particle detector measuring particulate density, and a piezo-electric device measuring electric current or voltage caused by air pressure.

The leak detection parameter value from a single sensor may be calculated as the average of multiple leak detection parameter values measured by a sensor 311 by repeating the measurement multiple times. The leak detection parameter value for a single sensor from a single location henceforth is considered to be the average of the multiple leak detection parameter values obtained by repeated measurements at a single location.

Control unit 303 calculates the predetermined threshold leak detection parameter value based on a running average of the leak detection parameter values measured by some or all sensors at some or all previous locations where no leak was detected. For example, the leak detection parameter value is calculated by multiplying the average leak detection parameter value by a factor greater than 1. The predetermined threshold leak detection parameter value is stored in the memory of the control unit. Alternatively, control unit 303 may use a threshold leak detection parameter value supplied by external means and stored in its memory.

Alternatively, control unit 303 calculates the predetermined threshold leak detection parameter value from the standard deviation values of some or all the leak detection parameter values measured by the sensors at the previous locations where no leak was detected. For example, there is inevitably some fluctuation of leak detection parameter values such measured by the sensors at multiple locations. Control unit 303 calculates a running standard deviation value from the leak detection parameter values. Control unit 303 calculates the predetermined threshold leak detection parameter value as a multiple of the standard deviation value. For example, for a 90% confidence level of correct leak detection, the predetermined threshold leak detection parameter can be set as 1.65 times the standard deviation. In this case, Control unit 303 compares the difference of the leak detection parameter value and the average leak detection parameter value with the predetermined threshold leak detection parameter value calculated by using the standard deviation as described above.

Control unit 303 detects the presence of a leak in the filter in the vicinity of a sensor if the leak detection parameter value is substantially different from the threshold leak detection parameter value. For example, if the pressure measured by a pressure sensor at a specific location is substantially higher than the threshold pressure value then control unit 303 determines there is a leak near the location of the sensor.

Subsequent to gathering leak detection parameter values from all sensors at a specific location of sensor arm 309 and sensors 311, control unit 303 sends a control signal to actuator 307 via link 313 to move sensor arm 309 to another location. Control unit 303 sends control signals to sensors 311 via link 315 one by one to activate and collect leak detection parameter values from each of sensors 311 as described earlier.

Control unit 303 places sensor arm 309 at multiple locations and collects leak detection parameter value corresponding to all locations where sensor arm 309 was placed. For a 50 cm wide filter, for example, if sensor data is collected at 25 different locations, then the location of a detected leak can be determined within an accuracy of 2 cm along the filter width. If the filter is 50 cm deep as well then 25 sensors attached to sensor arm 209 can also determine the presence of a leak with an accuracy of 2 cm along the depth of the filter. A leak location in this example is determined within a 2 cm×2 cm grid of the filter surface.

The accuracy of a detected leak location determination can be further increased by moving sensor arm 309 to multiple locations between the two locations of sensor arm 309 adjacent to the location where the leak is detected. Considering the previous example, sensor arm 309 is moved to 10 locations between the two adjacent locations to obtain accuracy of 0.4 cm for the location of the leak. The accuracy of leak location in the other direction, is however, fixed by the number of sensors attached to arm 309.

Figure 4:
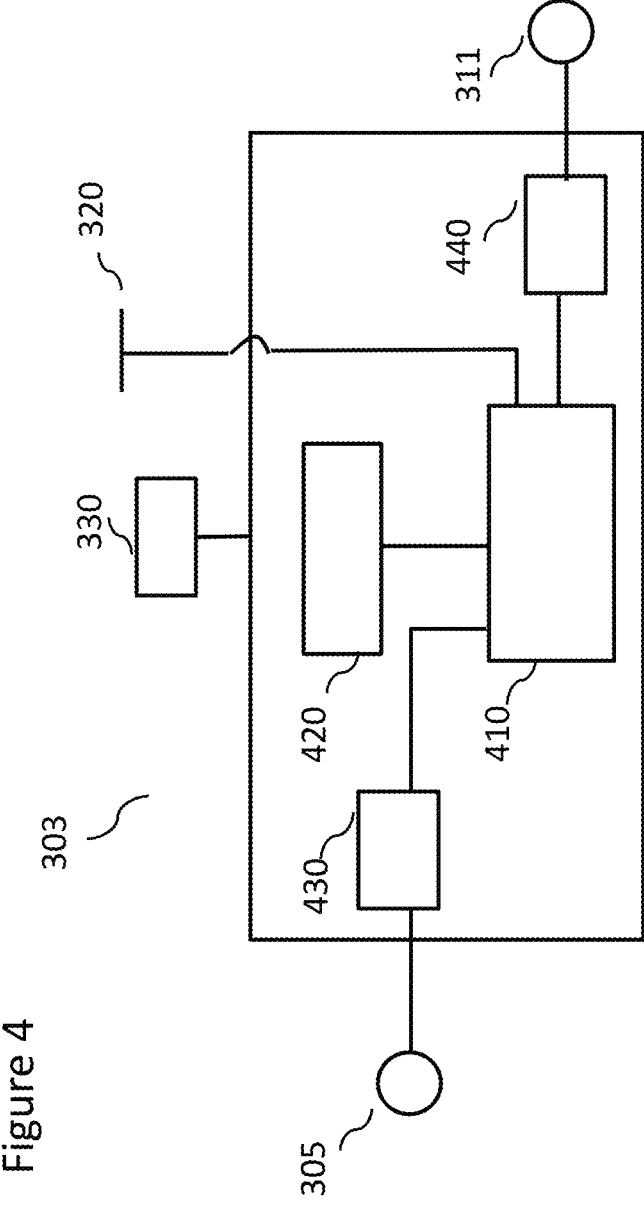
FIG. 4 depicts a schematic diagram of the salient components of a control unit in the filter leak detection system in accordance with an embodiment of the current invention.

FIG. 4 depicts a schematic diagram of the salient components of control unit 303 in filter leak detection system 200. Control unit 303 comprises a central processing unit (CPU) or a microcontroller unit (MCU) 410, a memory unit 420, an actuator controller 430, and a sensor controller 440. Memory unit 420 is coupled with processing unit 410 via data lines. Memory unit 420 can also be an integral part of processing unit 410. A software or a firmware program is stored in memory unit 420. Processing unit 410 is coupled with actuator controller 430 via control data lines. Processing unit 410 is coupled with antenna 320 to receive and send wireless communication data. Processing unit 410 is coupled with sensor controller 440 via control and data links.

The software program includes instructions for processing unit 410 to conduct leak detection measurement periodically. The periodicity of the measurements and the time of the measurement can be specified and changed in the program. At the instant of instructed measurement time, processing unit 410 sends an actuator activation signal to actuator controller 430. Actuator controller 430 responsive to receiving the activation signal from processing unit 410 activates actuators 305. Being activated actuator 305 moves sensor arm 309 to a location specified by actuator controller 430. The location information is received by actuator controller from processing unit 410. The location information data is calculated by the software program when run by processing unit 410 or is received from memory unit 420. When leak detection measurements are completed for a sensor measurement session, processing unit 410 sends an end session control signal to actuator controller 430. Upon receiving the end session control signal, actuator controller 430 moves sensor arm 309 to its resting location in a housing away from the active surface of filter 140.

Control unit 303 is activated to run a leak detection session periodically by the software program stored in memory 420 or is activated by an external command received by control unit 303 via antenna 320. Processing sensor data to determine the presence of a leak is performed by processing unit 410. If processing unit 410 determines the presence of a leak, then processing unit 410 sends a leak detection alert signal to an external computing device or cloud computing system via antenna 320. Alternatively, sensor data are sent to an external computing device or a cloud computing system via antenna 320. External computing devices or the cloud computing system process the sensor data and determines if there is a leak from the sensor data received from a measurement session. Control unit 303 or the external devices send a leak alert signal when the presence of a leak is detected.

Figure 5:
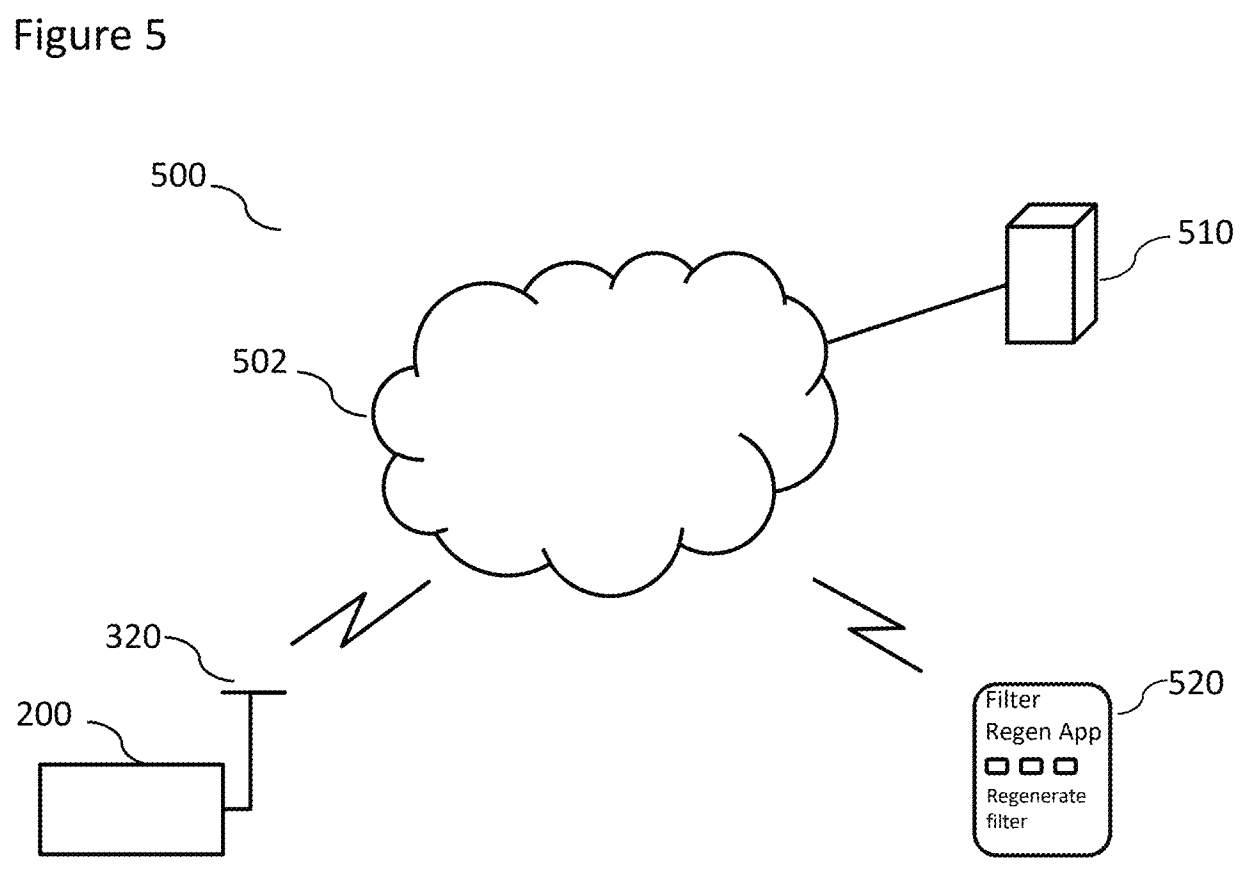

FIG. 5 depicts a schematic diagram of the salient components of a communication system 500 in accordance with the current invention. Communication system 500 comprises filter leak detection system 200, a wireless network 502, a server computer 510, and a user device 520. Antenna 320, server computer 510 and user device 520 are coupled via network 502. Typically, server computer 510 is coupled with network 502 via wired connection such as fiber optics links. User device 520 is typically a mobile phone coupled with wireless network 502 via radio links. Filter leak detection system 2000 is typically coupled with wireless network 502 via radio links between antenna 320 and one or more base station antennae in wireless network 502. Wireless network 502 is a WiFi network, a wireless network or a combination of wired, WiFi and wireless cellular networks.

Leak detection system 200 further comprises an airflow detection sensor (not shown) to detect if air is being blown through the filter. The airflow sensor can be an air velocity measurement device or a differential pressure measurement device. The airflow detection sensor is placed by actuator 307 or by another actuator in front of the filter on the upstream side of the airflow before activating sensor 311 and the presence of airflow is detected if the pressure is higher than nominal atmospheric pressure. Control unit 303 activates sensor 311 to take leak detection measurements only if airflow is present. Without airflow detection there would not be any difference in air pressure at a location where there is a leak compared to others where there is no leak. Thus, the implementation of airflow detection ascertains that a leak at a location would be detected if there is one.

Communication system 500 advantageously uses the IoT capabilities of wireless network 502. The IoT capabilities are based on technology standards defined by International Telecommunication Union (ITU) and 3GPP ($3^{rd}$ Generation Partnership Project—a telecommunications industry consortium). Devices and networks compliant with IoT standards specifications such as 3GPP TR 36.752 and ITU-T Y-2060 have several advantages. For example, communication protocols and bandwidth requirements are defined specifically for efficient usage by a significantly greater number of IoT devices for shorter bursts of communications compared to the requirements for human to human or human to machine communications. Because standards-based devices are used worldwide the components required to implement IoT features in devices are cheaper. The IoT capability provides the necessary infrastructure including communication protocols, security, device and network management, bandwidth specifications, etc. for device-to-device in other words communications among things. Thus, it is advantageous for communication system 500 to utilize the IoT capabilities for short and bursty communications by leak detection system 200 with computer server 510 and user device 520.

User device 520 includes an application program for communication with filter leak detection system 200. When a detected leak alert message is received from filter leak detection system 200 directly or from server 510, the application program is activated, and an appropriate alert is displayed on the user interface of the application program in user device 520. In addition to receiving alert messages, the user can send a filter status enquiry to filter leak detection system 200 or to server 510. In response to the enquiry, filter leak detection system 200 or server 510 sends the current filter status information for display on the user interface on the screen of user device 520. Furthermore, the user can send a new threshold leak detection parameter value to filter leak detection system 200 or server computer 510 and filter leak detection system 200 or server computer 510 stores the new threshold value in the memory. The alert message can also be in the form of a text message to user device 520.

Filter leak detection system 200 installation can be accomplished with the application program. For example, the user can download the application program from filter leak detection system manufacturer's website. The application program when opened asks the user to insert the device ID for filter leak detection device 200 which is typically printed on the device as a bar code or a QR Code. The application program then automatically communicates with the server to set up the user's account, to register and to activate leak detection system 200.

Figure 6:
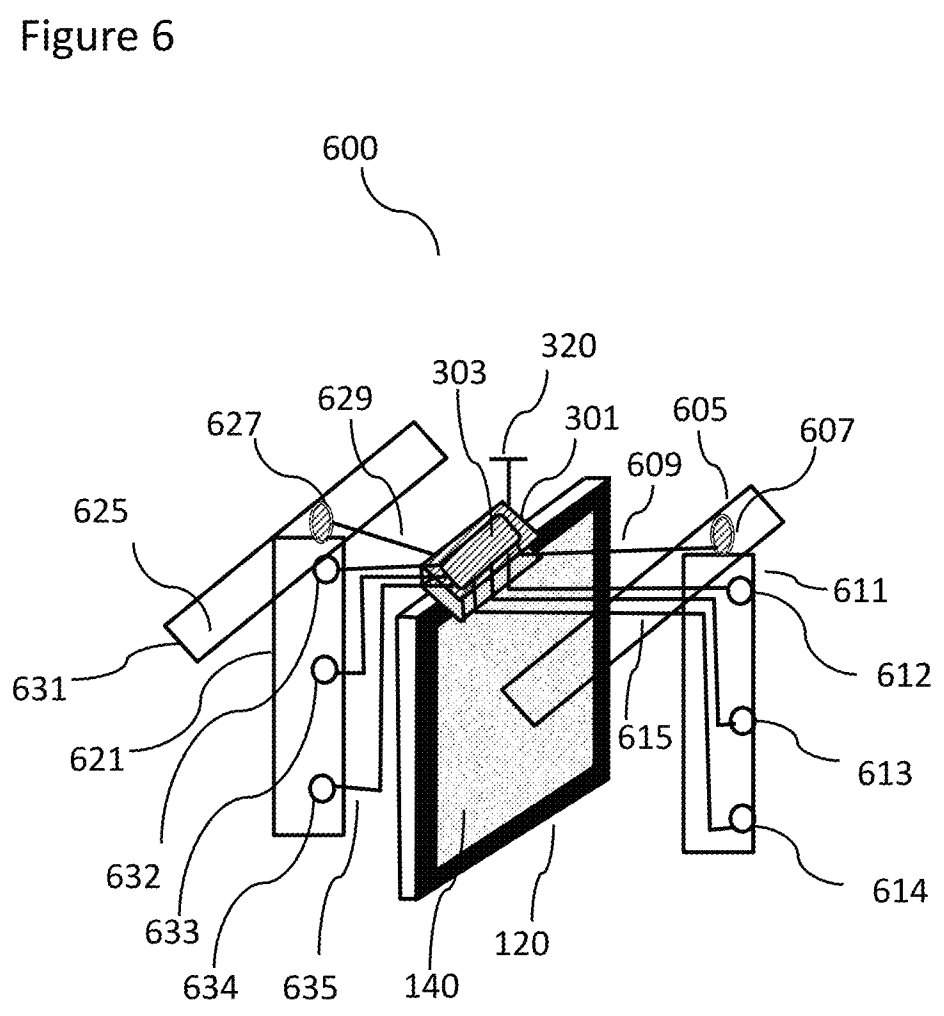

FIG. 6 depicts a schematic diagram of the salient components of filter leak detection system 600 in accordance with another embodiment of the current invention. Filter leak detection system 600 comprises housing 301, control unit 303, antenna 320, a first guide rail 605, a first actuator 607, a first sensor arm 611, a set of leak detection sensors 612, 613 and 614, a control and power link 609, a set of control, data and power links 615, a second guide rail 625, a second actuator 627, a second sensor arm 621, a set of leak detection sensors 632, 633 and 634, a control and power link 629, a set of control, and a set of data and power links 635. Housing 301 may include an enclosure (not shown) to store sensor arms 611 and 621 along with the sensors away from filter membrane 140.

Sensors 612, 613 and 614 are attached to sensor arm 611 in order to cover the entire height of the filter. Sensors 632, 633 and 634 are attached to sensor arm 621 which is located on the opposite side of filter 120 to cover the entire height of the filter on the opposite side of filter 120. Sensor pairs 612 and 632, 613 and 633, and 614 and 634 are attached to the sensor arms so that the pairs are at the same height. During one measurement session, control unit 303 directs actuators 607 and 627 to move sensor arms 611 and 631, respectively, by the same distance laterally. In each measurement session, sensor 612 and sensor 632 are placed at locations on opposite sides of filter 120. Similarly, sensor pairs 613 and 633, and 614 and 634 are placed at locations on opposite sides of filter 120 when actuators 607 and 627 place the sensor arms 611 and 621 at equal lateral distance when the sensors measure leak detection signals.

In this embodiment of the invention, control unit 303 controls actuator 607 via control link 609 to place sensor arm 611 to a particular location so that sensors 612, 613, and 614 can measure air pressure at their respective locations. Control unit 303 directs sensors 612, 613 and 614 to measure air pressure or an alternative sensing parameter such as air velocity, capacitance of a capacitor, voltage of a piezoelectric device, etc. and collects the sensor parameter value measured by sensors 612, 613 and 614. During this first measurement by sensors 612, 613 and 614, sensor arm 621 is still stored in housing 301 so filter membrane 104 is not blocked by sensor arm 621 and sensors 632, 633 and 644. When measurements by sensors 612, 613 and 614 are completed, sensor control 303 controls actuator 607 to move sensor arm 611 into the sensor arm enclosure of housing 301 away from filter membrane 140. Subsequently, control unit 303 directs actuator 627 to move sensor arm 621 to the same lateral distance as the sensor arm 611 during the first measurement. Control unit 303 directs sensors 632, 633 and 634 to measure the sensor parameter values and receives the sensor parameter values corresponding to the locations of sensors 632, 633 and 634 during this second measurement. Control unit 303 then controls actuator 627 to remove sensor arm 621 away from filter membrane 140 into the enclosure of sensor arm 621.

Control unit 303 receives a signal from an external source via antenna 320 to indicate if the air handling system is on. In order to detect a leak, it is necessary that air is blowing through the duct in which filter 120 is installed. Control unit 303 initiates sensor parameter measurements only if the air handling system is on. Alternatively, leak detection system

600 includes a differential pressure measurement device (not shown) regularly used in air handling systems to detect excessive pressure build-up when a filter is excessively dirty. The differential air pressure device has typically two components placed at fixed locations, one on each side of a filter. The differential pressure device measures the pressure difference between the two sides of the filter. Control unit 303 directs sensors 612, 613, 614, 632, 633, and 634 to measure sensor parameter values only when the differential pressure measured by the differential pressure measurement device is significant indicating that the air handling system is on.

Control unit 303 calculates a leak detection parameter value for each sensor pair, for example 612 and 621, 613 and 633, and 614 and 634) as the difference of the sensor parameter values measured by each of the sensor pair during a single measurement session. The control unit maintains a running average of the leak detection parameter values from all sensor pairs and previous measurements. For accurate average leak detection parameter, leak detection parameter values corresponding to locations where a leak is detected are excluded from the averaging. The running average may be used as the threshold leak detection parameter value. Alternatively, control unit 303 may use a threshold leak detection parameter value supplied by external means and stored in its memory.

Control unit 303 detects the presence of a leak in the filter in the vicinity of a sensor pair if the leak detection parameter value is substantially different from the threshold leak detection parameter value. For example, if the pressure difference measured by a sensor pair in the vicinity of a specific location of the filter between the pair of sensors in a measurement session is substantially lower than the threshold pressure value then control unit 303 determines there is a leak at the location of the filter between the sensor pair. Control unit 303 calculates and continuously updates the standard deviation while taking the average of the leak detection parameter values.

In yet another embodiment of the invention, only one set of sensors movable by an actuator as shown on FIG. 3 are used. In this embodiment, another sensor is placed in a fixed location on the other side (upstream side) of the filter such that the sensor does not block any part of the filter membrane. Either before or after the measurements by all the sensors in the downstream are completed, the sensor in the upstream measured the air pressure. The leak detection parameter value in this embodiment is calculated as the difference between the sensor value of the upstream sensor and each of the downstream sensors. The leak detection parameter for a downstream sensor in this embodiment is calculated as the difference of the fixed upstream sensor value and the downstream sensor value. The leak detection parameter is then compared with a corresponding leak detection threshold value and the presence of a leak is determined as described earlier.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative and are not necessarily drawn to scale. Reference throughout the specification to "first embodiment" or "second embodiment" or "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "first embodiment," "second embodiment," "third embodiment," "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus for the detection of a leak in a filter comprising: a control device, an actuator, and a first leak detection sensor;
    wherein the actuator places the first leak detection sensor at a first location in front of a membrane of the filter responsive to one or more actuation control signals received from the control device;
    wherein the first leak detection sensor is activated responsive to a first sensor activation signal received from the control device;
    wherein the first leak detection sensor measures a first leak detection parameter value;
    wherein the control device compares the first leak detection parameter value with a predetermined threshold leak detection parameter value in a first comparison; and
    wherein the control device determines the presence of a leak in the filter at a location in proximity to the first location based on the first comparison.

2. The apparatus of claim 1 further comprising an antenna;
    wherein the control device generates an alert signal based on the determination of the presence of a leak; and
    wherein the control device communicates the alert signal to a user device or to a server computer via the antenna.

3. The apparatus of claim 1 wherein the control device calculates an average value of some or all of the leak detection parameter values measured previously by the leak detection apparatus;
    wherein the control device calculates the predetermined threshold leak detection parameter value based on the average value.

4. The apparatus of claim 1 wherein the control device calculates a standard deviation value of some or all of the leak detection parameter values previously measured by the apparatus;
    wherein the control device calculates a predetermined leak detection parameter difference value based on the standard deviation value; and
    wherein the control device determines the presence of a leak if the magnitude of the difference value between the leak detection parameter value measured by the first leak detection sensor and the predetermined threshold leak detection parameter value is greater than the predetermined leak detection parameter difference value.

5. The apparatus of claim 1 wherein the apparatus further comprising a second leak detection sensor;
    wherein the actuator places the second leak detection sensor at a second location in front of the membrane of the filter responsive to the one or more actuation control signals;
    wherein the second leak detection sensor is activated responsive to a second sensor activation signal received from the control device;
    wherein the second leak detection sensor measures a second leak detection parameter value;
    wherein the control device compares in a second comparison the first leak detection parameter value with the second leak detection parameter value; and
    wherein the control device determines the presence of a leak in the filter at a location in proximity to the second location based on the second comparison.

6. The apparatus of claim 1 wherein the control device comprises a processing unit, a sensor controller, an actuator arm, an actuator controller, and a memory unit;
    wherein the first leak detection sensor is attached to the actuator arm;
    wherein the control device generates and sends the one or more actuation control signals responsive to a computer program stored in the memory unit and run in the processing unit; and
    wherein the actuator moves the actuator arm along with the first leak detection sensor attached to the actuation arm to the first location responsive to the actuation control signal.

7. The apparatus of claim 6 wherein the control device receives a message containing the predetermined threshold leak detection parameter value; and
    wherein the control device stores the predetermined threshold leak detection parameter value in the memory unit.

8. The apparatus of claim 1 wherein the first leak detection sensor is one of an air pressure measurement device, a piezoelectric device, a capacitance change measurement device, and a resistance change measurement device.

9. The apparatus of claim 1 wherein the first leak detection sensor is an air velocity measurement device, wherein the first leak detection parameter is the velocity of air.

10. The apparatus of claim 9 wherein the predetermined threshold leak detection parameter value is calculated based on a differential air pressure value; and
    wherein the differential air pressure value is the difference between the air pressure value on the upstream side of the filter and the air pressure value on the downstream side of the filter.

11. The apparatus of claim 1 wherein the control device receives a system status signal from an external source indicating if air is being blown through the filter; and
    wherein the control device activates the actuator and the first leak detection sensor only if the system status signal indicates that air is being blown through the filter.

12. The apparatus of claim 1 further comprising a housing, a communication device, an actuator controller, a first sensor controller, an actuator arm, a leak alert generation device, and an antenna;
    wherein the housing comprises one or more enclosures to enclose the control device, the actuator arm and the first leak detection sensor;

wherein the one or more enclosures are fixed in a location away from a membrane of the filter when the housing is mounted on a frame of the filter or on a part of an air circulation system;

wherein the first leak detection sensor is attached to the actuator arm;

wherein the communication device formats and sends the actuation control signal to the actuator controller;

wherein the communication device formats and sends the first sensor activation signal to the first sensor controller;

wherein the apparatus moves the actuator arm to place the first leak detection sensor to the first location responsive to the first actuation control signal;

wherein the first sensor controller activates the first leak detection sensor responsive to first sensor control signal;

wherein the first sensor controller sends the measured leak detection parameter value to the communication device;

wherein the leak alert generation device comprises a CPU, a memory and a network communication link;

wherein the CPU generates the first sensor control signal responsive to the execution of a computer program stored in the memory;

wherein the CPU sends the first sensor control signal to the first leak detection sensor using the network communication link;

wherein the CPU receives the leak detection parameter value;

wherein the CPU generates a leak alert signal based on the leak detection parameter value; and wherein the CPU sends the alert signal to a user device.

13. The apparatus of claim 12 further comprising a mobile device, an application program and a user interface;

wherein the application program is stored in the mobile device;

wherein the application program communicates with the leak alert generation device via the user interface;

wherein a user of the mobile device inserts a data indicative of the predetermined threshold leak detection parameter value via the user interface; and wherein the mobile device sends the data to the leak alert generation device.

14. An apparatus for the detection of a leak in a filter comprising: a first actuator, a first leak detection sensor, a second actuator, a second leak detection sensor, and a control device;

wherein the first actuator places the first leak detection sensor on a first side of a membrane of the filter responsive to a first actuation control signal received from the control device;

wherein the first leak detection sensor is activated responsive to a first sensor activation signal received from the control device;

wherein the first leak detection sensor measures the value of a first leak detection parameter value;

wherein the second actuator places the second leak detection sensor on a side opposite to the first side with respect to the filter membrane of the filter responsive to a second actuation control signal received from the control device;

wherein the second leak detection sensor is activated responsive to a second sensor activation signal received from the control device;

wherein the second leak detection sensor measures the value of a second leak detection parameter value;

wherein the control device calculates a difference value between the first leak detection parameter value and the second leak detection parameter value;

wherein the control device compares the difference value with a predetermined threshold leak detection parameter value; and wherein the control device determines the presence of a leak in the filter based on the comparison.

15. The apparatus of claim 14 wherein the control device calculates an average value of some or all of the difference values previously calculated by the control device;

Wherein the control device calculates the predetermined threshold leak detection parameter value based on the average value; and wherein the control device stores the predetermined threshold leak detection parameter value in a memory device.

16. The apparatus of claim 14 wherein the control device calculates a standard deviation value of some or all of the difference values previously calculated by the control device; and wherein the control device calculates the predetermined threshold leak detection parameter value based on the standard deviation.

17. The apparatus of claim 14 further comprising an external computer system;

wherein the computer system receives a leak alert signal from the control device when the control device determines the presence of a leak in the filter; and wherein the computer system communicates the leak alert signal to a user.

18. A method for detecting a leak in a filter by a filter leak detection apparatus comprising the steps of:

mounting a first leak detection sensor on a first location of a first sensor arm;

actuating a first actuator arm to place the first sensor arm at a second location on a first side of the filter responsive to a first actuation signal from a control device;

activating the first leak detection sensor to measure the value of a first leak detection parameter responsive to a first activation signal from the control device;

comparing the first leak detection parameter value with a predetermined threshold leak detection parameter value; and generating a filter leak detection signal based on the comparison.

19. The method of claim 18 further comprising:

calculating an average value of some or all of the first leak detection parameter values previously measured by the filter leak detection apparatus; and determining the predetermined threshold leak detection parameter value based on the average value.

20. The method of claim 18 further comprising:

mounting a second leak detection sensor on a third location of a second sensor arm;

actuating a second actuator arm to place the second sensor arm at a fourth location on a second side which is on the opposite side of the first side of the filter responsive to a second actuation signal received from the control device;

activating the second leak detection sensor responsive to a second activation signal to measure a second leak detection parameter value;

calculating a difference value between the first leak detection parameter value and the second leak detection parameter value;

calculating an average value of some or all of the difference values;

calculating the predetermined threshold leak detection parameter value based on the average value; and storing the predetermined threshold leak detection parameter value in a memory.

21. The method of claim 18 further comprising:

determining a location of the filter leak on the filter based on one or both of the first location and the second location.

\* \* \* \* \*